April 13, 1948.　　　G. A. KRUSE　　　2,439,475
ARTICLE GAUGING DISPENSING DEVICE
Filed June 19, 1947　　　2 Sheets-Sheet 1

INVENTOR.
GEORGE A. KRUSE
BY

April 13, 1948. G. A. KRUSE 2,439,475
ARTICLE GAUGING DISPENSING DEVICE
Filed June 19, 1947 2 Sheets-Sheet 2

INVENTOR.
GEORGE A. KRUSE
BY
Attorneys

Patented Apr. 13, 1948

2,439,475

UNITED STATES PATENT OFFICE 2,439,475

ARTICLE GAUGING DISPENSING DEVICE

George A. Kruse, East Orwell, Ohio, assignor to The Hospital Specialty Company, a corporation of Ohio Application June 19, 1947, Serial No. 755,578

6 Claims. (Cl. 312—48)

My invention relates to dispensing machines and particularly to machines for vending articles of a predetermined standard size.

An object of my invention is the provision of a dispensing machine which operates to dispense articles of a predetermined standard size and which does not operate to dispense articles of a sub-standard size, that is, articles of a size less than the predetermined standard size.

Another object is the provision of a dispensing machine which permits articles having a predetermined standard length to be dispensed therefrom upon operation of the machine and which prevents articles having a sub-standard length, that is, articles having a length less than a predetermined standard length, from being dispensed by the machine.

Another object is the provision of means for preventing the dispensation of articles having a sub-standard length from being dispensed by a machine designed to dispense articles of a standard length.

Another object is the provision for stopping or limiting the operation of a dispensing machine upon entry of an article of sub-standard length in the article-advancing mechanism of the machine.

Another object is the provision for the assurance of use of a dispensing machine for the dispensing only of standard merchandise intended for the machine by the manufacturer designing the machine.

Another object is the provision in a dispensing or vending machine of means for assuring rapid and efficient operation thereof in the dispensing of articles of merchandise having a standard length intended for dispensation in the machine.

Another object is the provision of means for stopping or locking the article-dispensing mechanism in a dispensing machine by an article of sub-standard length engaging a movable member responsive to the length of the articles.

Other objects and a fuller understanding of my invention may be had by referring to the following description and claims, taken in conjunction with the accompanying drawing, in which:

Figures 1, 2:
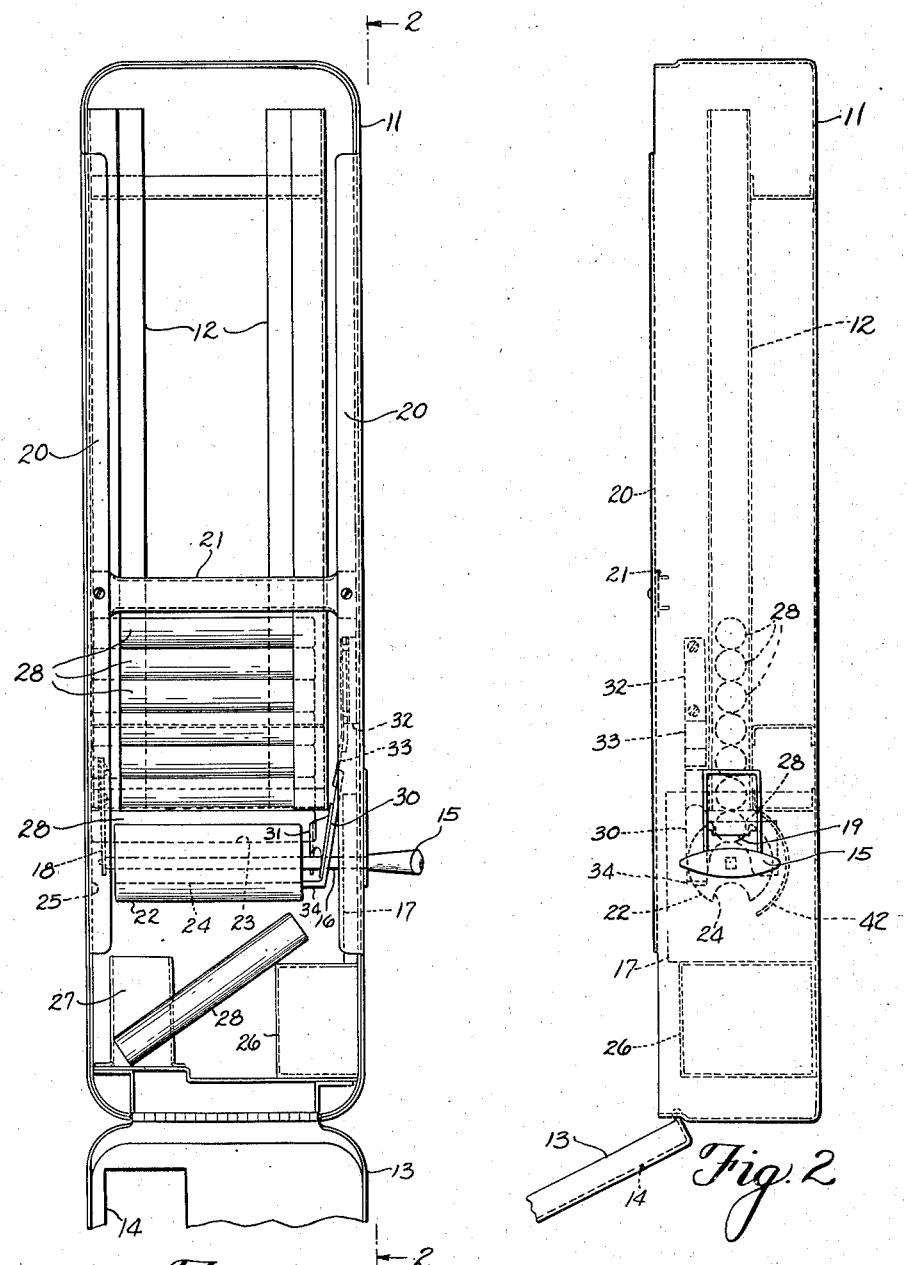
Figure 1 is the front view of my improved dispensing machine with the hinged cover moved downwardly to show the interior arrangement of the machine.
Figure 2 is a side view of the machine shown in Figure 1 and looking in the direction of the arrows 2—2 of Figure 1.

In the several views of the drawings, the reference character 11 denotes the long rectangular metal cabinet or housing of my machine. The cabinet 11 has a door 13 hinged at the bottom edge thereof and adapted to close the open front of the cabinet upon the swinging up of the door 13 on its hinge to engage with the side walls of the cabinet. The door 13 has an opening or outlet 14 which is of rectangular shape and disposed on the lower left-hand portion of the machine. The opening 14 is adapted to give access to the lower interior part of the machine for the withdrawal of articles by hand as they are dispensed by the mechanism.

The metal cabinet has longitudinally disposed inturned edge portions 20 extending in from the side walls of the cabinet. A cross-brace 21 joins the two portions 20 to provide strength and rigidity to the cabinet.

A channel or guide-way for holding a supply of articles in the machine is provided by two channel members 12 having their longitudinal slots facing each other. The rear portions of the channel members 12 are somewhat wider than the front portions. The top of the channel or guide-way formed by channel members 12 is open and articles may be placed down between the channel members 12 so as to align the articles in a side-by-side relationship with one on top of another. The inside surfaces of the channel members align the articles and retain them in a column ready for dispensing. Suitable braces or brackets secured to the back wall of the cabinet held the channel members 12 in position.

A rotatable article-advancing member 22 in general cylindrical shape is positioned within and transversely of the cabinet just below the channel members 12. The left-hand end of the shaft carrying the article-advancing member 22 is journaled to the bearing support 18 carried by the side wall of the cabinet 11, the left side of the cabinet being considered the left side as looking into the front of the cabinet as in Figure 1. The shaft 16 carries the article-advancing member 22 on the right side of the cabinet and is journaled to, and operatively connected with, a coin mechanism 17 which is secured to the inside side wall of the cabinet. The operating handle 15 is attached to the shaft 16 and is positioned on the outside of the cabinet and on the right-hand side thereof.

Operation of the handle 15 rotates the shaft 16 upon actuation of the coin mechanism 17 in the usual manner as by the insertion of a suitable coin in an opening 19 extending from the side of the cabinet. Without actuation by a coin in the coin mechanism 17 the handle 15 does not rotate the shaft 16 nor the article-advancing member 22.

Figure 6:
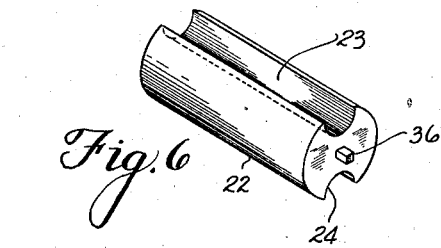
Figure 6 is a perspective view of the article-advancing member or cylinder as used in my machine for advancing articles from a column or supply of the articles toward an outlet of the machine.

The article-advancing member 22 is shown removed from the machine in Figure 6. It is of general cylindrical shape having a plurality of grooves or receptacles for receiving articles being advanced. In the embodiment shown there is a groove 23 and on the opposite side there is a groove 24, the two grooves being parallel and diametrically opposed. A tongue 36 extending from the axis of the cylinder 22 is adapted to couple with the shaft 16 so as to rotate therewith, the shaft 16 being keyed to the tongue 36 so that the shaft 16 and article-advancing member 22 rotate together when actuated by the coin mechanism.

Figure 3:
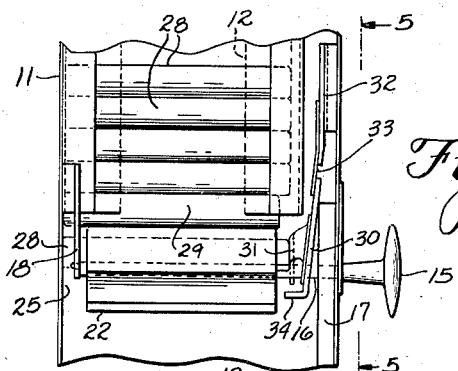
Figure 3 is a sectional portion of the front of the machine shown in Figure 1 and shows the article gauging feature of my machine in one position, as in the dispensing of an article of standard length.
Figure 5:
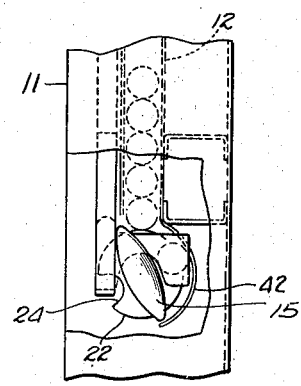
Figure 5 is a side view of the sectional portion shown in Figure 3 looking in the direction of the arrows 5—5 of Figure 3, and shows a portion of the side walls removed to show the interior parts of this machine.
Figure 4:
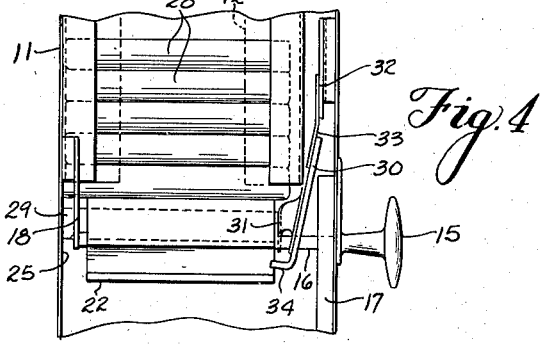
Figure 4 is another sectional portion of the front view of my machine shown in Figure 1 and shows the article gauging feature of my machine shown in another position, as when encountering an article of sub-standard length which stops or limits the movement of the article-advancing mechanism.

As seen in Figures 1, 3 and 4, the article-advancing member 22 is aligned with, and positioned below, the channel formed by the channel members 12. On the left-hand side of the cabinet opposite the left-hand end of the article-advancing member 22, the inside surface of the cabinet, denoted by the reference character 25, forms a continuation of the channel to provide an aligning and abutting surface engaging the left-hand end of articles being advanced by the article-advancing member 22. Thus, as articles in the grooves or receptacles of the article-advancing member are revolved upon rotation of the article-advancing member the left-hand end of the articles upon being moved or pressed to the left abuts on the surface 25 and is kept in alignment therewith through the article-advancing cycle.

In the lower portion of the cabinet 11, there is disposed a coin box 26 adapted to receive coins passing through the coin mechanism 17 as the handle 15 is operated and articles advance one by one in the dispensing operation. There is also disposed on the left-hand side of the cabinet in the lower portion thereof an inclined bank or slide 27 so disposed that the left-hand end of articles falling down from the article-advancing member 22 slide down and forwardly toward the opening 14 in the door 13. The slide 27 thus positions the articles after they are dispensed in a convenient position for removal by hand through the outlet 14.

In the illustration shown in the drawings, the standard articles of merchandise are of general elongated cylindrical shapes having a predetermined standard length. The spacing of the channel members 12 is such that articles having this predetermined standard length may freely move up and down between the channel members 12 and be kept in substantial alignment on their ends by the inside abutting surfaces of the channel members. The articles of standard length are slightly shorter than the width or space between the channel members 12 so that the articles may freely slide up and down and may be conveniently inserted into place.

The articles of standard length are denoted by the reference character 28, the articles being stacked one on top of each other and in aligned relationship within the channel formed by the channel members 12. As a purpose of this invention is to prevent the dispensation of articles of sub-standard length, that is, articles having a length substantially less than the standard length articles 28 there is shown in Figures 3 and 4 an article having a sub-standard length and denoted by the reference character 29. In Figure 3, the short article 29 is in the channel prior to its reception in a groove of the article-advancing member 22. In Figure 4 the short article of merchandise 29 is shown within a groove of the article-advancing member 22.

Figure 7:
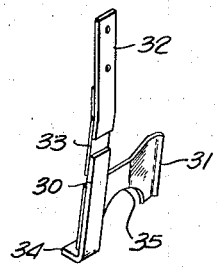
Figure 7 is a perspective view of the article gauging device used in my machine for governing the advance of articles through the article-advancing member in accordance with whether the articles are of standard length or sub-standard length.

To prevent the dispensation of sub-standard length articles, such as the article 29, there is provided a gauging device positioned within the cabinet on the right-hand side opposite the right-hand end of the article-advancing member 22. This gauging device is shown removed from the machine in Figure 7. It consists of a movable arm 30 carried by a support portion 32, there being a resilient leaf spring 33 joining the arm 30 and support 32. The ends of the leaf spring 33 are welded, riveted or otherwise suitably secured to the support 32 and the movable arm 30. There is an article-engaging portion or gauging member 31 carried by, and extending out at right angles to, the movable arm 30. The gauging portion 31 is welded, riveted or otherwise secured to the movable arm 30. There is an open space 35 cut away on the lower edge of the gauging portion 31 to accommodate the shaft 16 rotatable with the article-advancing member 22. At the lower end of the movable arm 30 there is a finger or stopping portion 34 extending out at right angles to the movable arm 30, the finger 34 being formed by the end of the arm 30 bent around at right angles.

The support portion 32 is bolted to the side wall of the cabinet 11 somewhat above the coin mechanism 17 as shown in the views of the drawing. The leaf spring 33 being bendable forms a hinge to permit the movement of the movable arm 30 toward and away from the right-hand end of the rotatable article-advancing member 22. The arm 30, and the finger portion 34 and gauging portion 31 carried thereby, are disposed to move outwardly or to the right as shown in the Figure 3, or to move inwardly or to the left as shown in Figure 4. The bias or tendency of the resilient portion 33 is such as to urge the arm member 30, finger 34, and gauging portion 31, moving as a unit, inwardly or toward the left as shown in Figure 4. The bias of the leaf spring 33, however, is such that its resiliency is overcome by an article of standard length being advanced by the article-advancing member and whose right-hand end engages the gauging portion 31.

An article leaving the channel and being advanced by the article-advancing member 22 is moved through a semi-circular path as it is revolved in one of the grooves of the member 22, the article moving from the bottom of the channel down to a lowermost portion of the cylindrical member 22 where it falls by gravity down to the lower portion of the cabinet, where it may be removed through the outlet 14. A semi-circular shaped guide member 42 retains the article being advanced in this semi-circular path as it is moved down from the channel to the bottom of the article-advancing member where it falls.

The position of the gauging device prior to the operation of the handle and coin mechanism and the movement of an article through its semi-circular path is shown in Figure 1. In this arrangement an article of standard length 28 is directly above the axis of the member 22 and is not yet moved back in its semi-circular path. The shape of the article-engaging member or gauging portion 31 is such that when the article is in this position the right-hand end of the article has not engaged the most inwardly extending part of the gauging portion 31 and the article-gauging device is not actuated by the presence of the article when in the position of Figure 1. The arm 30, finger 34 and gauging portion 31 are held in the position of Figure 1 by the bias of the spring 33 but the finger 34 meeting the solid end face of the cylinder article-advancing member 22 restrains the arm 30 and parts carried thereby from moving farther inwardly or to the left. The position of the Figure 1 might thus be referred to as the neutral position wherein the finger 34 slidably engages the solid end of the member 22 and the gauging portion 31 has not been fully contacted and pressed against by the right-hand end of the article 28 in the upper position of the member 22 as depicted in Figure 1.

As the article-advancing member 22 is rotated by the handle 15 to start its semi-circular path, the parts assume the positions shown in Figure 3. In this arrangement, the left-hand end of the articles 28 being advanced by the member 22 abuts on the surface 25 and is kept in alignment thereby with the other articles 28 in the channel. The right-hand end of article 28 slidably engages the gauging portion 31 and so presses the gauging portion 31 outwardly or to the right. The movement of the gauging portion 31 carries with it the arm 30 and finger 34 so that the gauging unit is swung to the right on the hinge provided by the spring 33. This outward movement to the right causes the finger 34 to clear the right-hand end of the cylindrical member 22 and the cylindrical member 22 may freely revolve without limitation or interference upon being actuated by the handle 15 through the linkage of the coin mechanism 17.

Articles of standard length, such as articles 28, thus may freely be advanced by the rotation of the article-advancing member 22 in the usual manner by operation of the lever 15 through the coin mechanism 17 upon deposit of a suitable coin.

Upon entry of a sub-standard or short article, as article 29, into a groove or receptacle of the article-advancing member 22 the parts assume the disposition shown in Figure 4. Here the short article 29 has commenced its semi-circular path and upon the finger 34 registering with an end of one of the grooves or receptacles 23 and 24, the finger 34 moves inwardly and catches in this irregularity in the end surface of member 22. Because the article 29 is pushed against the aligning surface 25 by the gauging portion 31 influenced by the spring 33 and because the article 29 is not of sufficient length to press the gauging portion 31 outwardly or to the right as was done in the arrangement of Figure 3, the arm 30 and finger 34 connected to the gauging portion 31 remain inwardly or to the left, as shown in Figure 4. As the short article 29 is too short to actuate the article-gauging device the finger 34 continues to be hooked or locked in a groove 23 or 24 to which it has been urged by the bias of the spring 33. This catching of the finger 34 in the irregular end surface of the member 22 limits the member 22 against further rotation and thus prevents advancement of the short article 29. The entire mechanism is thus locked and the dispensation of sub-standard length articles is prevented. The mechanism cannot be placed in operation again until the short or sub-standard length article, such as article 29, is removed and the machine again operated with standard length articles in the channel.

The predetermination of the standard length of articles to be dispensed is made and the spacing of the channels and the design and disposition of the gauging device is made in accordance with this predetermined length. The limits in which articles may be dispensed by the device may be set by the disposition of the gauging device in relation to the article-advancing member and the channel.

Figure 8:
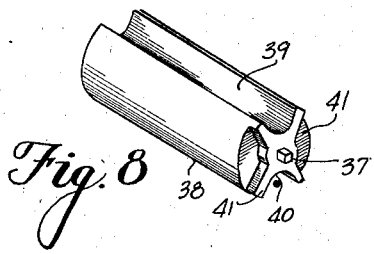
Figure 8 is a perspective view of a modified form of article-advancing member or cylinder which may be utilized in my machine.

From this disclosure it is obvious that variations and modifications may be made within the spirit and principle of my invention. For example, in Figure 8 I show one possible modification. In this the article-advancing member is modified in having another irregular shaped end surface on the right-hand end of the member. In this the article-advancing member is denoted by the reference character 36. It has opposite grooves or receptacles 39 and 40 and an end tongue 37 which couples with the shaft 16. Here there is a spider 41 on the right-hand end which forms a ratchet in which the finger 34 may fit intermittently and engage as a pawl. In this modification there are four depressions or wells in the end surface of the member into which the finger 34 may move to lock the member 36 against further rotation. In the form of Figure 6 there were two depressions or wells, these being the ends of the grooves 23 and 24.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a machine for dispensing articles of a predetermined standard length from the machine, said apparatus having a guide channel through which said articles are arranged transversely of said channel progress in a side-by-side sequence toward an outlet of said machine, the width of said channel providing a limitation on the maximum length of articles therein, a movable article-advancing member having groove means therein for receiving a said article and first interlocking means carried by said article-advancing member to move therewith, said guide channel extending adjacent one end of said article-advancing member to provide an abutting surface adapted to engage one end of a said article being advanced by said article-advancing member and being removed at the other end of said article-advancing member to provide access to the respective other end of the article, and operating means for sequential movement of said article-advancing member, the improvement of a device for preventing dispensing of articles having a length substantially less than said predetermined standard length, said device comprising a movable arm, said movable arm having an article-engaging portion, said article-engaging portion being disposed adjacent said other end of the article-advancing member in a position to be slidably engaged by said respective other end of an article being advanced by said article-advancing member, said movable arm also having a locking portion, said locking portion being adapted to interlock with said interlocking means carried by said article-advancing member, support means for supporting said movable arm, said support means permitting movement of said movable arm relative to said article-advancing element, and biasing means for biasing said movable arm toward said article-advancing element, the arrangement of said movable arm, article-engaging portion, locking portion, support means and biasing means providing that an article of standard length being advanced by said article-advancing member and slidably engaging said article-engaging portion opposes said biasing means and moves said arm and locking portion to hold said locking portion out of interlocking engagement with the interlocking means carried by said article-advancing element to permit said article advancing element to move and advance said article of standard length, and providing that an article having a length substantially less than said standard length and being advanced by said article-advancing element fails to move said arm and locking portion sufficiently to hold said locking portion out of interlocking engagement with said interlocking means carried by the article-advancing member and said biasing means causes said locking portion to move into interlocking engagement with said interlocking means to limit movement of said article-advancing member and prevent advancement toward said outlet of said article having a length substantially less than said standard length.

2. In a machine for dispensing articles of a predetermined standard length, said articles having a first end and second end, said machine having a movable article-advancing member adapted to move said articles from a column of said articles arranged in side-by-side relationship toward the machine outlet, said machine having aligning means adjacent a first end of said article-advancing element to contact and align the respective first end of articles being advanced by said article-advancing member, the length of said article-advancing member being such that a second end of articles of said standard length being advanced extends outwardly from the second end of said article-advancing member, said article-advancing member having an interlocking portion adapted to engage locking means for limiting movement of said article-advancing member, the improvement of means for preventing advancement of articles of sub-standard length by said article-advancing member comprising article-engaging means engaging said second end of articles being advanced, locking means movable with said article-engaging means and adapted to move toward a locking position and a non-locking position, support means for supporting said article engaging means and locking means and permitting their movement, biasing means for biasing said article engaging means and locking means in one direction, the arrangement of the article-engaging means, locking means, support means and biasing means being such that the second end of an article of standard length being advanced by said article-advancing member and engaging said article-engaging means moves the said locking means in opposition to said biasing means in an opposite direction for holding said locking means out of engagement with the interlocking portion of said article-advancing member and permitting the article-advancing member to move and advance said article of standard length toward said outlet, and such that the second end of an article of sub-standard length being advanced by said article-advancing member fails to sufficiently move said locking means in opposition to said biasing means in said opposite direction for holding said locking means out of engagement with the interlocking portion of said article-advancing member, and said engagement of the said locking means with said interlocking portion limits movement of the article-advancing member and prevents advancement of said article of sub-standard length toward said outlet.

3. In an article dispensing machine having a rotatable article-advancing member said member having article receptacle means for accommodating articles being advanced, aligning means for aligning a first end of said articles being advanced, and operating means for rotating said article-advancing member, said article-advancing member and aligning means providing for the uniform extension of an opposite end of articles having a standard length from said article-advancing member, the improvement of means for preventing advancement of articles of sub-standard length by said article-advancing member, comprising in combination an arm member swingably carried by said machine to move toward and away from said article-advancing member, a contact member carried by said arm member and adapted to be engaged by a second end of articles being advanced by said article-advancing member, a finger member carried by said arm member and adapted to engage in said receptacle means and to limit rotation thereby of said article-advancing member upon movement of the finger member toward said article-advancing member, and resilient means for biasing said arm member, contact member and finger member toward said article-advancing member, the disposition of the contact member, arm member and finger member being such that the second end of articles of standard length moves the contact member, arm member and finger member, in opposition to the said resilient means, away from said article-advancing member to hold the finger member disengaged from said receptacle means and permit the article-advancing member to rotate and advance said articles of standard length, and the second end of articles of sub-standard length insufficiently moves the contact member, arm member and finger member and said finger member biased by said resilient means engages in said receptacle means to limit rotation of the article-advancing member and prevent advancement of said articles of sub-standard length.

4. A device for preventing advancement of articles of sub-standard length from a dispensing machine proportioned to dispense articles of a predetermined standard length, said machine having a rotatable advancing member, the rotatable article-advancing member having an irregular-surface portion movable therewith, said article-advancing member being adapted to sequentially advance articles from a supply container toward an outlet of said machine, comprising in combination, a gauging member adapted to engage an end of an article of standard length and thereby to be moved away from said article-advancing member, a stopping member adapted to engage in said irregular-surface portion and to limit the rotation of said article-advancing member upon movement of the stopping member toward said article-advancing member, support means for supporting said gauging member and stopping member and providing for the movement of said stopping member in accordance with movement of said gauging member, and biasing means urging said gauging member toward said article-advancing member, the combination of the gauging member, stopping member, support means and biasing means being such that the gauging member engaged by an end of an article of standard length being advanced by said article-advancing member opposes said biasing means and moves the stopping member on said support means out of engagement with said irregular-surface portion to permit rotation of the article-advancing member, and such that in the absence of an article of standard length being advanced by said article-advancing member the said stopping member engages in said irregular-surface portion to limit rotation of said article-advancing member.

5. In a dispensing machine having a rotatable cylinder for advancing articles, the said cylinder having groove means for receiving an article being advanced, a gauging device comprising in combination a swingable arm movable toward and away from an end of said cylinder, said arm having a first portion engageable by an end of an article being advanced and movable thereby, said arm having a second portion adapted to engage in said groove means, and spring means urging said second portion into engagement with said groove means, said spring means being opposable by a said article engaging said first portion.

6. In an article dispensing machine having an article-advancing member, an article gauging device comprising an arm member, an article engaging member extending from said arm member in substantially the plane of said arm member and being movable relative to said article-advancing member, a finger member extending from said arm member in a plane at an angle to the plane of said arm member and movable therewith, said finger member being adapted to control movement of said article-advancing member, and a leaf spring carried by said machine and connected to said arm member, said leaf spring providing a hinge for movement of said arm member and a bias for urging said arm member in one direction relative to said article-advancing member.

GEORGE A. KRUSE.